United States Patent [19]
Sato et al.

[11] Patent Number: 5,737,283
[45] Date of Patent: Apr. 7, 1998

[54] REPRODUCING METHOD AND APPARATUS USING ABSOLUTE TIME DATA

[75] Inventors: Itaru Sato; Shigeto Yanagi, both of Chiba; Susumu Matsunaga, Kanagawa, all of Japan

[73] Assignee: Sony Corporation, Tokyo, Japan

[21] Appl. No.: 629,444

[22] Filed: Apr. 9, 1996

[30] Foreign Application Priority Data

Apr. 10, 1995 [JP] Japan .................................. 7-083705

[51] Int. Cl.$^6$ .................................................. G11B 17/22
[52] U.S. Cl. ................................................. 369/32; 369/50
[58] Field of Search ................................. 369/32, 33, 47, 369/48, 50, 54, 58, 60, 44.25, 44.27, 44.28, 30; 360/78.14

[56] References Cited

U.S. PATENT DOCUMENTS 5,406,537  4/1995  Lee .......................................... 369/48 X

*Primary Examiner*—Paul W. Huber
*Attorney, Agent, or Firm*—Frommer Lawrence & Haug LLP; William S. Frommer

[57] ABSTRACT

An apparatus for reproducing information from a disc-shaped record medium, which comprises an optical reading head for reading a program information signal and absolute time data from an optical disc, a reading position driving portion for moving a reading position set by the optical reading head on the optical disc, an information reproducing portion for obtaining a reproduced program information signal and reproduced absolute time data based on outputs from the optical reading head, a memory portion for storing the reproduced absolute time data, a reference time data supplying portion for supplying reference time data corresponding to the absolute time data, a data comparing portion for comparing the reproduced absolute time data read from the memory portion with the reference time data supplied from the reference time data supplying portion, a control signal producing portion for forming a reading position control signal in response to a comparison output from the data comparing portion, and a reading position control portion for controlling in response to the reading position control signal the reading position driving portion so as to cause the reading position set by the optical reading head on the optical disc to reach a position corresponding to the reference time data.

15 Claims, 2 Drawing Sheets

REPRODUCING METHOD AND APPARATUS USING ABSOLUTE TIME DATA

BACKGROUND OF THE INVENTION

1. Field of the Invention

This invention relates generally to method and apparatus for reproducing information from a disc-shaped record medium, and more particularly, is directed to improvements in methods and apparatus for reproducing information based on information signals read by information reading-means from a disc-shaped record medium on which program information signals, such as audio information signals, video information signals and so on, are recorded to form a spiral record track, together with address information signals including time data.

2. Description of the Prior Art

There has been proposed to be put to practical use a so-called optical disc which is a disc-shaped record medium on which program information signals, such as audio information signals, video information signals and so on, are recorded to form a spiral record track, together with address information signals including time data, as information signals readable by optical information reading means. The program and address information signals recorded on the optical disc are formed to have a predetermined data format.

The data format for the information signals recorded on the optical disc includes, for example, successive small-scale frame segments each constituting a data unit. The duration of each small-scale frame segment is, for example, about 136 microseconds and therefore the repetition frequency of one small-scale frame segment is about 7.35 kHz, and each small-scale frame segment comprises a synchronous portion containing small frame synchronous information which is synchronous information at a cyclic period of small-scale frame segment, a sub-coding portion, and a data portion containing program information.

The sub-coding portion contains address information forming a unit within each large-scale frame segment which comprises, for example, ninety-eight small-scale frame segments. The duration of each large-scale frame segment is 13.3 milliseconds and therefore the repetition frequency of one large-scale frame segment is about 75 Hz. Each sub-coding segment is divided into, for example, eight channels including channels P to W, and each of the sub-coding portions in the first and second small-scale frame segments at the beginning of each large-scale frame segment is provided through the channels P to W therein with large-scale frame synchronous information, while each of the sub-coding portions in the remaining ninety-six small-scale frame segments forming the large-scale frame segment, in cooperation with the first and second small-scale frame segments, is provided at the channel Q therein with address information accompanying program information in the data portion.

FIG. 1 of the accompanying drawings shows one example of a data format of the channel Q. The channel Q in this example includes the large-scale frame synchronous information B and C, control code data CONT and ADR, program number data PNR representing a program number as an example of a number for each program information section, movement number data X representing a movement number as an example of a number for each part of one program information section, time address data M, S and FR containing time address information representing running time within each program information section, which is expressed in minutes, seconds and large-scale frame numbers in one second, respectively, zero date Z representing zero, absolute time data AM, AS and AFR containing absolute time information representing running time from the beginning end of the spiral record track, which is expressed in minutes, seconds and large-scale frame numbers in one second, respectively, and data CRC for error checking.

As mentioned above, the address information forms one unit thereof within each large-scale frame segment. Therefore, a unit of address information is obtained at every large-scale frame segment, that is, at every $1/75 = 13.3$ milliseconds, in reproduction of information signals from the optical disc. In such a case, each of the duration of the small-scale frame segment, the duration of the large-scale frame segment, the time represented by the time address data M, S and FR, and the time represented by the absolute time data AM, AS and AFR is running time under a condition wherein the program information and the address information are reproduced from the optical disc in the mode of normal reproducing operation.

The reproduction of the program information and the address information from the optical disc on which the program and address information signals formed to have the predetermined data format are recorded to form the spiral record track, as mentioned above, is performed by an apparatus for reproducing information from the optical disc, which is usually called an optical disc player. In the optical disc player, a disc supporting portion for supporting the optical disc put thereon to be rotatable and optical information reading means which is usually called an optical reading head are provided so that a reading position is set by the optical reading head on the optical disc to be move in accordance with the rotation of the optical disc. The reading position set by the optical reading head is controlled to follow the spiral record track formed on the optical disc. Such a control as to cause the reading position set by the optical reading head to follow the spiral record track formed on the optical disc is called a tracking servocontrol.

When the optical disc is subjected to information reproduction by the optical disc player, it is not required always to commence to read the program and address information signals from the beginning end portion of the spiral record track but often desired to commence to read the program and address information signals from a certain point selected at will on the spiral record track. In order to commence to read the program and address information signal from the certain point selected at will on the spiral record track, it is necessary to carry correctly the reading position set by the optical reading head to a target position corresponding to the certain point selected at will on the optical disc in advance of start of reading.

An operation for causing the reading position set by the optical reading head to reach one of target positions on the optical disc is usually called a search operation and there have been proposed various ways or systems for the search operation. In the previously proposed search operation, a target position on the optical disc is determined and an actual reading position set by the optical reading head on the optical disc is detected so that the actual reading position is compared with the target position to produce a comparison output. Then, the reading position set by the optical reading head on the optical disc is driven in response to the comparison output to move rapidly in the direction transversing a plurality of turns of the spiral record track to reach the target position.

In such a case, the address information signal read from the optical disc by the optical reading head is utilized for detecting the actual reading position set by the optical reading head on the optical disc. That is, the actual reading position set by the optical reading head is detected on the strength of the program number data PNR representing the number for each program information section and the movement number data X representing the number for each part of one program information section, which are reproduced on the basis of the address information signal read from the optical disc by the optical reading head. Accordingly, the target position on the optical disc is determined by designating selected program number data PNR representing the number for a selected program information section and selected movement number data X representing the number for a selected part of one program information section.

As described above, in the previously proposed search operation, the reading position set by the optical reading head on the optical disc is moved to reach the target position by designating the program number data PNR representing the number for the selected program information section and the movement number data X representing the number for the selected part of one program information section.

However, in the case where the search operation is performed under such a situation that it is required to commence to read the program and address information signals from a target position provided on a part of spiral record track on which a program information signal which needs a relatively long time to be read through is recorded, such difficulties that complicated handlings are required and relatively long time is expended for causing the reading position set by the optical reading head to reach the target position are brought about. Namely, in the case where a target position is provided on a part of spiral record track on which a program information signal which represents a program information requiring a relatively long time to be fully reproduced, such as a movie information, is recorded, since each of a large number of portions of the spiral record track, which correspond respectively to different movement number data X each representing the same number, extends over a relatively long range and the target position is identified with only designated movement number data X, handlings for moving the reading position set by the optical head must be repeatedly performed in order to carry the reading position set by the optical head into a portion of the spiral record track which corresponds to the designated movement number data X and then another handlings for moving further the reading position set by the optical head minutely within the portion of the spiral record track which corresponds to the designated movement number data X must be carried out in order to cause the reading position set by the optical head to reach the target position.

OBJECTS AND SUMMARY OF THE INVENTION

Accordingly, it is an object of the present invention to provide a method and apparatus for reproducing information from a disc-shaped record medium on which program information signals are recorded to form a spiral record track, together with address information signals including time data, which avoids the aforementioned difficulties encountered with the prior art.

Another object of the present invention is to provide a method and apparatus for reproducing information from a disc-shaped record medium on which program information signals are recorded to form a spiral record track, together with address information signals including time data, by which an operation for causing a reading position set by information reading means on the disc-shaped record medium to reach a target position can be rapidly and surely carried out in advance of the start of reproduction of the information based on the information signals read from the disc-shaped record medium.

A further object of the present invention is to provide a method and apparatus for reproducing information from a disc-shaped record medium on which program information signals are recorded to form a spiral record track, together with address information signals including time data, by which an operation for causing a reading position set by information reading means on the disc-shaped record medium to reach a target position can be easily carried out with relatively simple handlings in advance of start of reproduction of the information based on the information signals read from the disc-shaped record medium even under a condition wherein each of the program information signals recorded on the disc-shaped record medium requires a relatively long time to be read through.

According to an aspect of the present invention, there is provided an apparatus for reproducing information from a disc-shaped record medium, which comprises an information reading portion for reading a program information signal and absolute time data from a disc-shaped record medium on which the program information signal are recorded together with the absolute time data, a reading position driving portion for moving a reading position set by the information reading portion on the disc-shaped record medium, an information reproducing portion for, obtaining a reproduced program information signal and reproduced absolute time data based on outputs from the information reading portion, a memory portion for storing the reproduced absolute time data obtained from the information reproducing portion, a reference time data supplying portion for supplying reference time data corresponding to the absolute time data, a data comparing portion for comparing the reproduced absolute time data read successively from the memory portion with the reference time data supplied from the reference time data supplying portion to produce a comparison output, a control signal producing portion for forming a reading position control signal in response to the comparison output obtained from the data comparing portion, and a reading position control portion for controlling in response to the reading position control signal the reading position driving portion so as to cause the reading position set by the information reading portion on the disc-shaped record medium to reach a position corresponding to the reference time data.

According to another aspect of the present invention, there is provided a method of reproducing information from a disc-shaped record medium, which comprises the steps of obtaining a reproduced program information signal and reproduced absolute time data based on outputs obtained by means of reading a program information signal and absolute time data by an information reading portion from a disc-shaped record medium on which the program information signal is recorded together with the absolute time data, supplying a memory portion with the reproduced absolute time data successively, comparing the reproduced absolute time data read successively from the memory portion with reference time data corresponding to the absolute time data to produce a comparison output, forming a reading position control signal in response to the comparison output, and causing a reading position driving portion for moving a reading position set by the information reading portion on the disc-shaped record medium to control the reading position to reach a position corresponding to the reference time data.

In the method and apparatus for reproducing information from a disc-shaped record medium thus constituted in accordance with the present invention, with an arrangement that the reading position set by the information reading portion on the disc-shaped record medium can be moved by the reading position driving portion, the target position on the disc-shaped record medium is represented by the reference time data corresponding to the absolute time data, and the actual reading position on the disc-shaped record medium is detected on the strength of the reproduced absolute time data which is obtained based on the read information signals from the information reading portion to be stored in the memory portion successively and then read from the memory portion successively. Then, the reading position set by the information reading portion on the disc-shaped record medium is moved by the reading position driving portion in response to the reading position control signal which is formed in response to the comparison output obtained as the result of comparing the reproduced absolute time data read successively from the memory portion with the reference time data so as to reach the position corresponding to the reference time data. In such a manner as mentioned above, the operation for causing the reading position set by the information reading portion on the disc-shaped record medium to reach the target position is carried out.

In such a case, the absolute time data represents, for example, a position on a spiral record track formed on the disc-shaped record medium with running time from the beginning end of the spiral record track, which is expressed in minutes, seconds and large-scale frame numbers in one second, and therefore the target position on the disc-shaped record medium represented by the reference time data which corresponds to the absolute time data is specified in great detail. Further, the reproduced absolute time data which is compared with the reference time data also represents the reading position set by the information reading portion on the disc-shaped record medium with running time from the beginning end of the spiral record track, which is expressed in minutes, seconds and large-scale frame numbers in one second.

Accordingly, a condition wherein the reading position set by the information reading portion on the disc-shaped record medium is controlled in response to the comparison output obtained by comparing the reproduced absolute time data read successively from the memory portion with the reference time data so that the reproduced absolute time data coincides with the reference time data is rapidly and surely brought about. As a result, the operation for causing the reading position set by the information reading portion on the disc-shaped record medium to reach the target position can be easily, rapidly and surely carried out with relatively simple handlings in advance of start of reproduction of the information based on the information signals read from the disc-shaped record medium even under a condition wherein each of the program information signals recorded on the disc-shaped record medium requires a relatively long time to be read through.

The above and other objects, features and advantages of the present invention will become apparent from the following detailed description which is to be read in conjunction with the accompanying drawings.

DESCRIPTION OF THE PREFERRED EMBODIMENT

Figure 2:
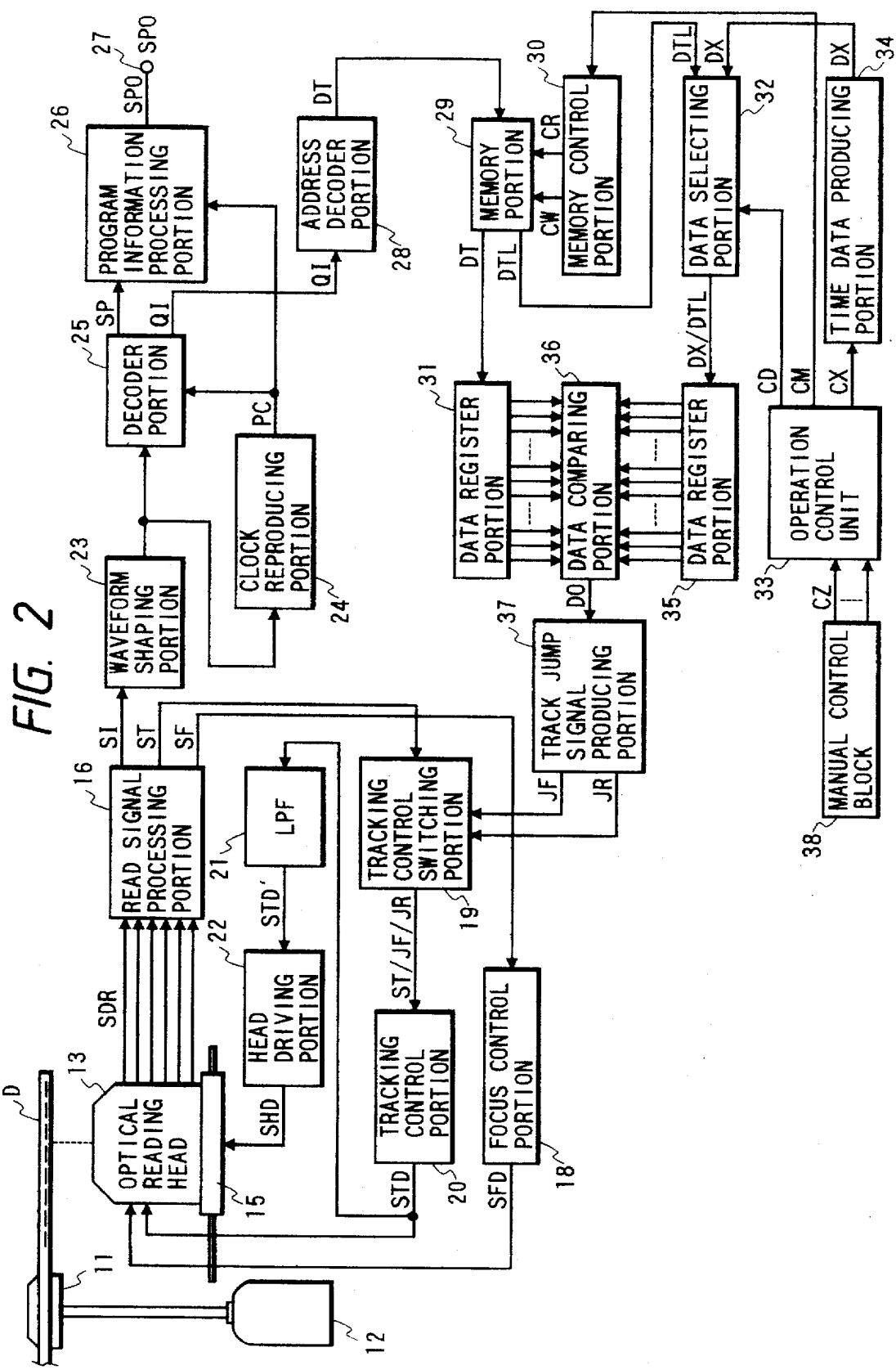
FIG. 2 is an illustration used for explanation of a forward track jump operation carried out in the embodiment shown in FIG. 1.

FIG. 2 shows schematically an essential part of one embodiment of apparatus for reproducing information from a disc-shaped record medium according to the present invention, in which an embodiment of method of reproducing information from a disc-shaped record medium according to the present invention is performed. In this embodiment, an optical disc D which is a disc-shaped record medium on which program information signals, such as audio information signals, video information signals and so on, are recorded to form a spiral record track, together with address information signals including absolute time data inserted into a channel Q in a data format, as aforementioned, is supported by a disc table 11 which is able to rotate at a predetermined speed. The absolute time data recorded on the optical disc D represents a position on the spiral record track formed on the optical disc D with running time from the beginning end of the spiral record track, which is expressed in minutes, seconds and large-scale frame numbers in one second.

The optical disc D is rotated together with the disc table 11 which is driven to rotate by a disc driving portion 12. In connection with the optical disc D supported by the disc table 11, an optical reading head 13 is provided to face to a lower surface of the optical disc D.

The optical reading head 13 constitutes an information reading portion operative to read the program information signals and the address information signals accompanying with the program information signals from the optical disc D and to produce read information signals SDR and contains an optical system for causing a reading light beam, which is formed with, for example, a laser light beam, to impinge upon the spiral record track on the optical disc D and for detecting the reading light beam which reflects from the spiral record track on the optical disc D to return by a plurality of photo detectors. Further, the optical reading head 13 is accompanied with a head driving mechanism 15 which is constituted by, for example, a linear motor mechanism, and operative to move the optical reading head 13 in a direction along the radius of the optical disc D, namely, a direction transversing a plurality of turns of the spiral record track on the optical disc D.

The read information signals SDR obtained from the photodetectors contained in the optical reading head 13 is supplied to a read signal processing portion 16 and a reproduced information signal SI, a tracking error signal ST and a focus error signal SF are obtained from the read signal processing portion 16. The reproduced information signal SI includes the program and address information signals read from the spiral record track on the optical disc D. The tracking error signal ST represents the degrees of positional deviation from the spiral record track for the reading position set by the optical reading head 13 on the optical disc D. The focus error signal SF represents the degrees of defocussing of the reading light beam on the spiral record track.

The focus error signal SF obtained from the read signal processing portion 16 is supplied to a focus control portion 18. The focus control portion 18 which has its output end connected with a focus adjusting device contained in the optical reading head 13 is operative to produce a focus driving signal SFD in response to the focus error signal SF and to supply the focus adjusting device contained in the optical reading head 13 with the focus driving signal SFD to drive the focus adjusting device based on the focus error signal SF, so that a focus servocontrol for causing the reading light beam to be appropriately focused at the spiral record track on the optical disc D is carried out.

The tracking error signal ST obtained from the read signal processing portion 16 is supplied through a tracking control switching portion 19 to a tracking control portion 20. The tracking control portion 20 which has its output end connected with a tracking adjusting device contained in the optical reading head 13 is operative to produce a tracking driving signal STD in response to the tracking error signal ST and to supply the tracking adjusting device contained in the optical reading head 13 with the tracking driving signal STD to drive the tracking adjusting device based on the tracking error signal ST, so that a tracking servocontrol for causing the reading position set by the optical reading head 13 on the optical disc D to follow appropriately the spiral record track on the optical disc D is carried out.

The tracking driving signal STD obtained from the tracking control portion 20 is also supplied through a low pass filter (LPF) 21 and a low frequency signal STD' corresponding to low frequency components of the tracking driving signal STD is obtained from the LPF 21 to be supplied to a head driving portion 22. The head driving portion 22 which has its output end connected with the head driving mechanism 15 accompanying the optical reading head 13 is operative to produce a head driving signal SHD in response to the low frequency signal STD' and to supply the head driving mechanism 15 with head driving signal SHD to drive head driving mechanism 15 based on the low frequency signal STD', so that the optical reading head 13 is controlled to move in the direction along the radius of the optical disc D and the reading position set by the optical reading head 13 on the optical disc D is corrected.

The head driving mechanism 15 accompanying the optical reading head 13, the tracking adjusting device contained in the optical reading head 13, the tracking control portion 20, the LPF 21 and the head driving portion 22 in the aggregate constitute reading position moving means for moving the reading position set by the optical reading head 13 on the optical disc D.

The reproduced information signal SI obtained from the read signal processing portion 16 is supplied through a waveform shaping portion 23 to a clock reproducing portion 24 and a decoder portion 25. A bit clock pulse signal PC having relation to the program and address information signals recorded on the optical disc D. In the decoder portion 25, the reproduced information signal SI is demodulated with use of the bit clock pulse signal PC to produce a reproduced program information signal SP and a reproduced channel Q information signal QI which is a reproduced output of channel Q information representing address information in the channel Q in the data format.

The reproduced program information signal SP obtained from a decoder portion 25 is supplied to a program information processing portion 26. The program information processing portion 26 is supplied also with the bit clock pulse signal PC and the reproduced program information signal SP is subjected to various signal processings to produce an output signal SPO representing reproduced program information in the program information processing portion 26. The output signal SPO is derived from the program information processing portion 26 to an output terminal 27.

The reproduced channel Q information signal QI obtained from the decoder portion 25 is supplied to an address decoder portion 28 and reproduced absolute time data DT which are absolute time data contained in the reproduced channel Q information signal QI are obtained from the address decode portion 28. The decoder portion 25 and the address decoder portion 28 in the aggregate constitute information reproducing means for obtaining the reproduced program information signal SP and the reproduced absolute time data DT based on the read information signals SDR derived from the optical reading head 13.

The reproduced absolute time data DT obtained from the address decoder portion 28 represent the reading position set by the optical reading head 13 on the optical disc D, at which the reproduced absolute time data DT in question are obtained, with running time from the beginning end of the spiral record track on the optical disc D, which is expressed in minutes, seconds and large-scale frame numbers in one second. The reproduced absolute time data DT are successively written in a memory portion 29 comprising a random access memory (RAM) in response to a writing control signal CW derived from a memory control portion 30 so as to be stored the same. A reading control signal CR is also derived from the memory control portion 30 to the memory portion 29 and the reproduced absolute time data DT stored in the memory portion 29 are successively read from the memory portion 29 in response to the reading control signal CR and supplied to a data register portion 31 so as to be held therein temporarily.

In the memory portion 29, a final reproduced absolute time data DTL which is the reproduced absolute time data DT stored finally in the memory portion 29 just before each interruption in reading of the program information signal and the address information signal including the absolute time data from the optical disc D by the optical reading head 13, are held thereafter during the interruption in reading. Then, when the reading of the program information signal and the address information signal from the optical disc D by the optical reading head 13 is resumed, the final reproduced absolute time data DTL are selectively read from the memory portion 29 in response to the reading control signal CR supplied from the memory control portion 30. The final reproduced absolute time data DTL thus read from the memory portion 29 are supplied to a data selecting portion 32. The writing control signal CW and the reading control signal CR supplied to the memory portion 29 from the memory control portion 30 are controlled by a control signal CM derived from an operation control unit 33 to the memory control portion 30.

Further, a time data producing portion 34 which is supplied with a time data designating signal CX from the operation control unit 33 and produces designated time data DX which have its contents designated by the time data designating signal CX. The designated time data DX correspond to the absolute time data contained in the address information signal recorded on the optical disc D. The designated time data DX thus obtained from the time data producing portion 34 are also supplied to the data selecting portion 32.

A control signal CD from the operation control unit 33 is further supplied to the data selecting portion 32. In the data selecting portion 32, a first condition in which the final reproduced absolute time data DTL obtained from the memory portion 29 is derived therefrom as a reference time data and a second condition in which the designated time data DX obtained from the time data producing portion 34 is derived therefrom as a reference time data are selectively raised.

The final reproduced absolute time data DTL or the designated time data DX derived from the data selecting portion 32 as the reference time data are held by a data register portion 35 temporarily. The data selecting portion 32 and the time data producing portion 34 in the aggregate constitute reference time data supplying means for supplying the reference time data, namely, the final reproduced absolute time data DTL or the designated time data DX, corresponding to the absolute time data contained in the address information signal recorded on the optical disc D.

The reproduced absolute time data DT held temporarily by the data register portion 31 and the final reproduced absolute time data DTL or the designated time data DX as the reference time data are compared with each other in a data comparing portion 36 and a comparison output signal DO representing the resume of comparison of the reproduced absolute time data DT and the final reproduced absolute time data DTL or the designated time data DX as the reference time data is obtained from the data comparing portion 36 to be supplied to a track jump signal producing portion 37.

In the track jump signal producing portion 37, a forward track jump signal JF is produced when the comparison output signal DO obtained from the data comparing portion 36 shows that the time represented by the reproduced absolute time data DT is shorter than the time represented by the final reproduced absolute time data DTL or the designated time data DX as the reference time data and a reverse track jump signal JR is produced when the comparison output signal DO obtained from the data comparing portion 36 shows that the time represented by the reproduced absolute time data DT is longer than the time represented by the final reproduced absolute time data DTL or the designated time data. DX as the reference time data. Further, any track jump signal is not produced in the track jump signal producing portion 37 when the comparison output signal DO obtained form the data comparing portion 36 shows that the time represented by the reproduced absolute time data DT is equal to the time represented by the final reproduced absolute time data DTL or the designated time data DX as the reference time data. The forward track jump signal JF or the reverse track jump signal JR obtained from the track jump signal producing portion 37 is supplied to the tracking control switching portion 19.

When the forward track jump signal JF from the track jump signal producing portion 37 is supplied to the tracking control switching portion 19, the tracking control switching portion 19 is operative to supply the tracking control portion 20 with the forward track jump signal JF in place of the tracking error signal ST obtained from the read signal processing portion 16. In the tracking control portion 20 to which the forward track jump signal JF is supplied, the tracking driving signal STD is formed on the strength of the forward track jump signal JF to be supplied to the tracking adjusting device contained in the optical reading head 13 and LPF 21. The tracking adjusting device contained in the optical reading head 13 is driven by the tracking driving signal STD formed on the strength of the forward track jump signal JF and the head driving portion 22 is caused to drive the head driving mechanism 15 with the head driving signal SHD formed based on the tracking driving signal STD.

Figure 1:
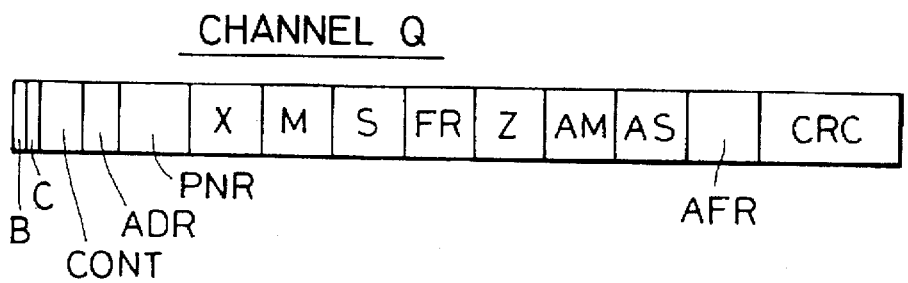
FIG. 1 is a schematic block diagram showing an essential part of one embodiment of apparatus for reproducing information from a disc-shaped record medium according to the present invention, in which an embodiment of the method of reproducing information from a disc-shaped record medium according to the present invention is performed.
Figure 3:
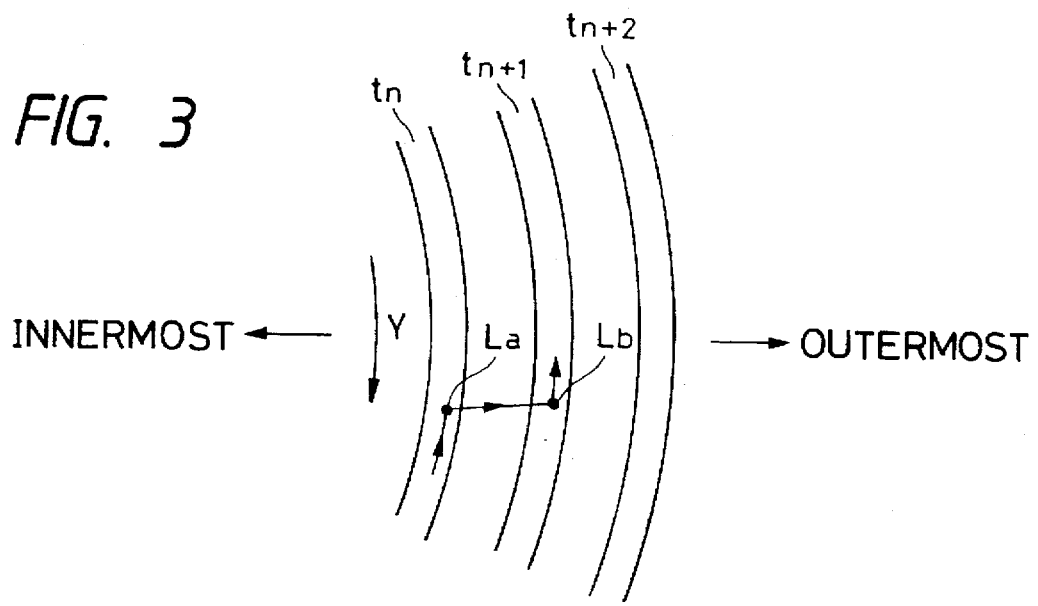
FIG. 3 is an illustration used for explanation of a reverse track jump operation carried out in the embodiment shown in FIG. 1.

As a result, the head driving mechanism 15 and the tracking adjusting device contained in the optical reading head 13 are operative to move the reading position set by the optical reading head 13 on the optical disc D by means of a forward track jump operation. Under the forward track jump operation, as shown in FIG. 3, the reading position set by the optical reading head 13 on the optical disc D which is rotating in the direction shown with an arrow Y jumps to move rapidly from a position La on a turn tn of the spiral record track to a position Lb on a turn tn+1 of the spiral record track next outward to the turn tn, and the information signals recorded on a part of the spiral record track beginning with the position Lb are read by the optical reading head 13. Such a jump movement of the reading position is repeatedly carried out so that the reading position set by the optical reading head 13 on the optical disc D is moved to reach a position on the spiral record track which corresponds to the final reproduced absolute time data DTL or the designated time data as the reference time data.

When the reverse track jump signal JR from the track jump signal producing portion 37 is supplied to the tracking control switching portion 19, the tracking control switching portion 19 is operative to supply the tracking control portion 20 with the reverse track jump signal JR in place of the tracking error signal ST obtained from the read signal processing portion 16. In the tracking control portion 20 to which the reverse track jump signal JR is supplied, the tracking driving signal STD is formed on the strength of the reverse track jump signal JR to be supplied to the tracking adjusting device contained in the optical reading head 13 and LPF 21. The tracking adjusting device contained in the optical reading head 13 is driven by the tracking driving signal STD formed on the strength of the reverse track jump signal JR and the head driving portion 22 is caused to drive the head driving mechanism 15 with the head driving signal SHD formed based on the tracking driving signal STD.

Figure 4:
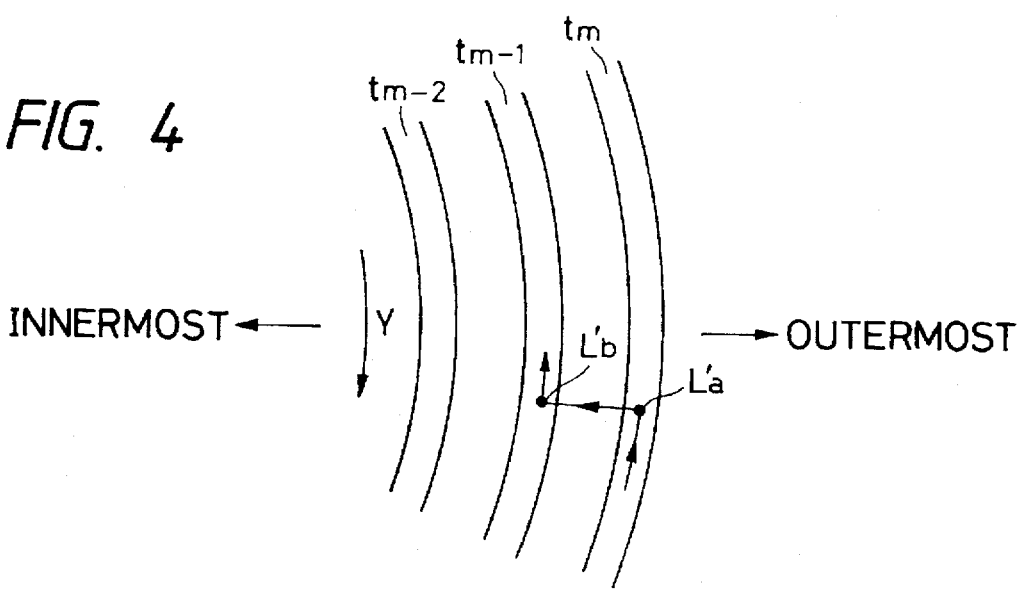
FIG. 4 is an illustration showing an example of a data format of channel Q in a sub-coding portion of an information signal recorded on an optical disc.

As a result, the head driving mechanism 15 and the tracking adjusting device contained in the optical reading head 13 are operative to move the reading position set by the optical reading head 13 on the optical disc D by means of a reverse track jump operation. Under the reverse track jump operation, as shown in FIG. 4, the reading position set by the optical reading head 13 on the optical disc D which is rotating in the direction shown with an arrow Y jumps to move rapidly from a position L'a on a turn tm of the spiral record track to a position L'b on a turn tm−1 of the spiral record track next inward to the turn tm, and the information signals recorded on a part of the spiral record track beginning with the position L'b are read by the optical reading head 13. Such a jump movement of the reading position is repeatedly carried out so that the reading position set by the optical reading head 13 on the optical disc D is moved to reach a position on the spiral record track which corresponds to the final reproduced absolute time data DTL or the designated time data DX as the reference time data.

The data register portions 31 and 35 and the data comparing portion 36 in the aggregate constitute comparing means for comparing the reproduced absolute time data DT read successively from the memory portion 29 with the final reproduced absolute time data DTL or the designated time data DX as the reference time data supplied from the reference time data supplying portion to produce the comparison output signal DO. The track jump signal producing portion 37 constitutes control signal producing means for forming the forward track jump signal JF or the reverse track jump signal JR as a reading position control signal in response to the comparison output signal DO obtained from the data comparing portion 36. The tracking control switching portion 19 constitutes reading position control means for controlling, in response to the reading position control signal, namely, the forward track jump signal JF or the reverse track jump signal JR, obtained from the track jump signal producing portion 37, the reading position driving means including the head driving mechanism 15, the tracking adjusting device contained in the optical reading head 13, the tracking control portion 20, the LPF 21 and the head driving portion 22 so as to cause the reading position set by the optical reading head 13 on the optical disc D to reach the position corresponding to the final reproduced absolute time data DTL or the designated time data DX as the reference time data.

The operation control unit 33 is accompanied with a manual control block 38 and operation command signals CZ are supplied to the operation control unit 33 in response to handlings on the manual control block 38.

When a starting-point designated information reproducing mode in which the reading of the program and address information signals from the optical disc D by the optical reading head 13 is started with a position on the spiral record track corresponding to the designated time data DX obtained from the time data producing portion 34, the manual control block 38 is operated to supply the operation control unit 33 with the operation command signal CZ commanding the starting-point designated information reproducing mode.

Then, the time data designating signal CX formed in response to the operation command signal CZ, the control signal CM and the control signal CD are supplied from the operation control unit 33 to the time data producing portion 34, the memory control portion 30 and the data selecting portion 32, respectively. The designated time data DX having its contents designated by the time data designating signal CX is supplied from the time data producing portion 34 to the data selecting portion 32. The data selecting portion 32 is controlled by the control signal CD to derive the designated time data DX to an output end thereof as the reference time data and therefore the designated time data DX obtained at the output end of the data selecting portion 32 is supplied to the data register portion 35 as the reference time data to be temporarily held therein.

With the control signal CM from the operation control unit 33, the writing control signal CW and the reading control signal CR supplied to the memory portion 29 from the memory control portion 30 are so arranged that the reproduced absolute time data DT obtained from the address decoder portion 28 are successively written in the memory portion 29 in response to the writing control signal CW and the reproduced absolute time data DT written in the memory portion 29 are successively read in response to the reading control signal CR. The reproduced absolute time data DT read from the memory portion 29 are supplied to the data register portion 31 to be temporarily held therein.

Then, the reproduced absolute time data DT held temporarily in the data register portion 31 and the designated time held temporarily in the data register portion 35 as the reference time data are compared with each other in the data comparing portion 36 and the comparison output signal DO representing the result of comparison is obtained from the data comparing portion 36 to be supplied to the track jump signal producing portion 37. In the track jump signal producing portion 37, the forward track jump signal JF or the reverse track jump signal JR are produced in response to the comparison output signal DO to be supplied to the tracking control switching portion 19.

As a result, the head driving mechanism 15 and the tracking adjusting device contained in the optical reading head 13 are operative to move the reading position set by the optical reading head 13 on the optical disc D toward the position on the spiral record track corresponding to the designated time data DX by means of the forward or reverse track jump operation continuously until the reading position reaches the position corresponding to the designated time data DX. After the reading position has reached the position corresponding to the designated time data DX, the reading of the program and address information signals from the optical disc D by the optical reading head 13 are started with the position on the spiral record track corresponding to the designated time data DX.

When a connecting information reproducing mode in which the reading of the program and address information signals from the optical disc D by the optical reading head 13 is once interrupted and thereafter resumed with a position following the position at which the reading of the program and address information signals is previously stopped, the manual control block 38 is handled to supply the operation control unit 33 with the operation command signal CZ commanding the connecting information reproducing mode.

Then, the control signal CM and the control signal CD formed in response to the operation command signal CZ are supplied from the operation control unit 33 to the memory control portion 30 and the data selecting portion 32, respectively. With the control signal CM from the operation control unit 33, the reading control signal CR and the writing control signal CN supplied to the memory portion 29 from the memory control portion 30 are so arranged that the final reproduced absolute time data DTL written in the memory portion 29 are read in response to the reading control signal CR. Then, the reproduced absolute time data DT obtained from the address decoder portion 28 are written in the memory portion 29 in response to the writing control signal CW and the reproduced absolute time data DT written in the memory portion 29 are successively read in response to the reading control signal CR.

The final reproduced absolute time data DTL read from the memory portion 29 are supplied to the data selecting portion 32. The data selecting portion 32 is controlled by the control signal CD to derive the final reproduced absolute time data DTL to an output end thereof as the reference time data and the final reproduced absolute time data DTL obtained at the output end of the data selecting portion 32 is supplied to the data register portion 31 as the reference time data to be temporarily held therein. The reproduced absolute time data DT are read from the memory portion 29 after the final reproduced absolute time data DTL have been read and supplied to the data register portion 31 to be temporarily held therein.

The reproduced absolute time data DT held temporarily in the data register portion 31 and the final reproduced absolute time data DTL held temporarily in the data register portion 35 as the reference time data are compared with each other in the data comparing portion 36 and the comparison output signal DO representing the result of comparison is obtained from the data comparing portion 36 to be supplied to the track jump signal producing portion 37. In the track jump signal producing portion 37, the forward track jump signal JF or the reverse track jump signal JR are produced in response to the comparison output signal DO to be supplied to the tracking control switching portion 19.

As a result, the head driving mechanism 15 and the tracking adjusting device contained in the optical reading head 13 are operative to move the reading position set by the optical reading head 13 on the optical disc D toward the position on the spiral record track corresponding to the final reproduced absolute time data DTL by means of the forward or reverse track jump operation continuously until the reading position reaches the position corresponding to the final reproduced absolute time data DTL. After the reading position has reached the position corresponding to the final reproduced absolute time data DTL, the reading of the program and address information signals from the optical disc D by the optical reading head 13 are started with the position on the spiral record track corresponding to the final reproduced absolute time data DTL.

What is claimed is:

1. An apparatus for reproducing information from a disc-shaped record medium, which comprises:

information reading means for reading a program information signal and absolute time data from a disc-shaped record medium on which the program information signal are recorded together with the absolute time data, wherein said absolute time data represents a temporal position of said program information signal on said disc-shaped record medium;

reading position driving means for moving a reading position set by the information reading means on the disc-shaped record medium;

information reproducing means for obtaining a reproduced program information signal and reproduced absolute time data based on outputs from the information reading means;

memory means for storing the reproduced absolute time data obtained from the information reproducing means;

reference time data supplying means for supplying reference time data indicating a target temporal position on said disc-shaped record medium;

data comparing means for comparing the reproduced absolute time data with the reference time data supplied from the reference time data supplying means to produce a comparison output;

control signal producing means for forming a reading position control signal in response to the comparison output obtained from the comparing means; and reading position control means for controlling in response to the reading position control signal the reading position driving means so as to cause the reading position set by the information reading means on the disc-shaped record medium to reach said target temporal position corresponding to the reference time data.

2. An apparatus according to claim 1, wherein said reference time data supplying means includes time data producing means for producing designated time data from the reference data which can be compared directly to the absolute time data.

3. An apparatus according to claim 2, wherein said reference time data supplying means includes data selecting means for selecting between the designated time data obtained from the time data producing means and the reproduced absolute time data stored in the memory means as the reference time data.

4. An apparatus according to claim 3, wherein said reproduced absolute time data stored in the memory means represents said temporal position of said information reading means before an interruption in reading of the program information signal and the absolute time data from the disc-shaped record medium, wherein said reading position control means causes said information reading means to reach said absolute time data stored in said memory means when said interruption occurs.

5. An apparatus according to claim 1, wherein said data comparing means comprises a first data register means in which the reproduced absolute time data read from the memory means are held temporarily, a second data register means in which the reference time data obtained from the reference time data supplying means are held temporarily, and comparing means for comparing the reproduced absolute time data held in said first data register means with the reference time data held in the second data register to produce a comparison output.

6. An apparatus according to claim 1, wherein said control signal producing means is operative to produce the reading position control signal as a track jump signal with which the reading position control means controls the reading position driving means so as to move the reading position set by the information reading means on the disc-shaped record medium by means of a track jump operation.

7. An apparatus according to claim 1, wherein said disc-shaped record medium includes tracks where said program information signal is recorded, said program information is segmented into discrete frame segments comprising a sub-coding portion which includes the absolute time data for each respective frame segment and a data portion, said absolute time data representing the time required for said information reading means to track from the beginning of said disc-shaped record medium to said respective frame segment, wherein said reading position control means, responsive to said reference time data, is operative to cause said information reading means to track to said target temporal position.

8. A method of reproducing information from a disc-shaped record medium, which comprises the steps of:

reading a program information signal and absolute time data from a disc-shaped record medium on which the program information signal is recorded together with the absolute time data, wherein said absolute time data represents a temporal position of said program information signal on said disc-shaped record medium;

storing successively reproduced absolute time data in a memory;

comparing the absolute time data read successively from the memory with reference time data indicating a target temporal position on said disc-shaped record medium to produce a comparison output;

forming a reading position control signal in response to the comparison output; and moving a reading position to reach said target temporal position corresponding to the reference time data.

9. A method according to claim 8, further comprising the step of producing said reference time data from designated time data which can be compared directly to the absolute time data.

10. A method according to claim 9, further comprising the step of selecting between said designated time data and the reproduced absolute time data stored in the memory.

11. A method according to claim 10, wherein said reproduced absolute time data stored in the memory represents said temporal position before an interruption in reading of the program information signal and the absolute time data from the disc-shaped record medium, wherein said reading position is caused to reach said temporal position of said absolute time data stored in said memory when said interruption occurs.

12. A method according to claim 8, wherein the reading position control signal is a track jump signal which causes a jump in the reading position on the disc-shaped record medium according to a track jump operation.

13. An apparatus according to claim 12, wherein a user sets said reference time data.

14. A method according to claim 8, wherein said disc-shaped record medium includes tracks where said program information signal is recorded, said program information is segmented into discrete frame segments comprising a sub-coding portion which includes the absolute time data for each respective frame segment and a data portion, said absolute time data represents the time required for tracking from the beginning of said disc-shaped record medium to said respective frame segment, wherein said step of reading, responsive to said reference time data, tracks the reading position to said target temporal position.

15. A method according to claim 14, further comprising the step of user-selecting said reference time data.

* * * * *